US009465581B2

(12) United States Patent
Chu et al.

(10) Patent No.: US 9,465,581 B2
(45) Date of Patent: *Oct. 11, 2016

(54) AUTOMATED METHOD AND SYSTEM FOR PREDICTING HIGH RESOLUTION TIDAL HEIGHTS AND CURRENTS IN COASTAL ZONES

(71) Applicant: THE UNITED STATES OF AMERICA, AS REPRESENTED BY THE SECRETARY OF THE NAVY, Washington, DC (US)

(72) Inventors: Yifei Philip Chu, Slidell, LA (US); Cheryl Ann Blain, Slidell, LA (US); Robert S Linzell, Carriere, MS (US)

(73) Assignee: The United States of America, as represented by the Secretary of the Navy, Washington, DC (US)

( * ) Notice: Subject to any disclaimer, the term of this patent is extended or adjusted under 35 U.S.C. 154(b) by 263 days.

This patent is subject to a terminal disclaimer.

(21) Appl. No.: 14/280,611

(22) Filed: May 18, 2014

(65) Prior Publication Data

US 2014/0257776 A1    Sep. 11, 2014

Related U.S. Application Data

(63) Continuation of application No. 13/243,639, filed on Sep. 23, 2011, now Pat. No. 8,768,663.

(60) Provisional application No. 61/391,289, filed on Oct. 8, 2010.

(51) Int. Cl.
*G06G 7/56*  (2006.01)
*G06F 7/57*  (2006.01)
(Continued)

(52) U.S. Cl.
CPC .................. *G06F 7/57* (2013.01); *G01W 1/00* (2013.01); *G06F 17/50* (2013.01); *G06F 17/5009* (2013.01); *G06F 2217/16* (2013.01)

(58) Field of Classification Search
CPC .......... G06G 7/57; G06G 17/50; G01W 1/00
USPC ............................................................. 703/5
See application file for complete search history.

(56) References Cited

U.S. PATENT DOCUMENTS

| 5,115,417 A | * | 5/1992 | Saunders | ............. G04G 9/0076 368/19 |
| 5,342,144 A | * | 8/1994 | McCarthy | ................. E03F 1/00 405/36 |

(Continued)

OTHER PUBLICATIONS

Hogan et al. ("The Description of the Navy Operational Global Atmospheric Prediction System's Spectral Forecast Model", Naval Oceanographic and Atmospheric, Research Laboratory, 1991).*

(Continued)

*Primary Examiner* — Omar Fernandez Rivas
*Assistant Examiner* — Iftekhar Khan
(74) *Attorney, Agent, or Firm* — US Naval Research Laboratory; Scott G. Bell

(57) ABSTRACT

System and method for automatically and regularly predicting water level and currents in coastal areas, without operator intervention. The system and method can enable automated operational forecasts at regular time intervals without operator intervention by using a grid and a computer forecast model that allows accurate prediction of tidal heights and currents in complex shoreline and bathymetry regions, single or parallel processing capability, optimal available processor assignment based on the size of computing domain, standard and other tidal database forcing in the open boundary, missing data gap-filling, and wind, bathymetry, and model-derived boundary condition model integration.

18 Claims, 16 Drawing Sheets
(5 of 16 Drawing Sheet(s) Filed in Color)

(51) Int. Cl.
  *G01W 1/00* (2006.01)
  *G06F 17/50* (2006.01)

(56) References Cited

U.S. PATENT DOCUMENTS

| | | | | |
|---|---|---|---|---|
| 6,346,193 | B1* | 2/2002 | Bauer | B01D 35/05 |
| | | | | 210/150 |
| 7,251,563 | B2* | 7/2007 | Keen | H04B 11/00 |
| | | | | 702/2 |
| 7,251,564 | B2* | 7/2007 | Posey | G01W 1/10 |
| | | | | 702/3 |
| 7,277,797 | B1* | 10/2007 | Kunitsyn | G01V 1/008 |
| | | | | 702/15 |
| 7,283,908 | B2 | 10/2007 | Posey et al. | |
| 7,620,536 | B2* | 11/2009 | Chow | G05B 17/02 |
| | | | | 702/66 |
| 8,655,924 | B2* | 2/2014 | Blain | G06F 17/30312 |
| | | | | 702/3 |
| 8,768,663 | B2 | 7/2014 | Chu | |
| 9,032,001 | B2* | 5/2015 | Stumpf | G06F 17/30398 |
| | | | | 707/805 |
| 2010/0094597 | A1* | 4/2010 | Blain | G06T 17/20 |
| | | | | 703/1 |
| 2016/0016646 | A1* | 1/2016 | Mun | G01C 21/203 |
| | | | | 701/21 |

OTHER PUBLICATIONS

Richard M. Hodur ("The Naval Research Laboratory's Coupled Ocean/Atmosphere Mesoscale Prediction System (COAMPS)", Naval Research Laboratory, 1996).*

Nicholas Baer ("Determing how to calculate river discharge", SSAC, 2007).*

Blain et al. ("Tidal Prediction Using the Advanced Circulation Model (ADCIRC) and a Relocatable PC-based System", journal of the Oceanography Society, 2001).*

Yoon et al. ("Estimating river bathymetry from data assimilation of synthetic SWOT measurements", Journal of Hydrology 464-465 (2012) 363-375).*

\* cited by examiner

AUTOMATED METHOD AND SYSTEM FOR PREDICTING HIGH RESOLUTION TIDAL HEIGHTS AND CURRENTS IN COASTAL ZONES

CROSS-REFERENCE TO RELATED APPLICATIONS

This Application is a continuation of U.S. patent application Ser. No. 13/243,639 entitled AUTOMATED METHOD AND SYSTEM FOR PREDICTING HIGH RESOLUTION TIDAL HEIGHTS AND CURRENTS IN COASTAL ZONES, filed on Sep. 23, 2011, which is a nonprovisional application of U.S. Provisional Patent Application No. 61/391,289 filed on Oct. 8, 2010, under 35 USC 119(e), the entire disclosures of which are incorporated herein by reference.

BACKGROUND

Methods and systems disclosed herein relate generally to automated forecasting, and specifically to automated forecasting of tidal heights and currents in coastal regions.

Accurate prediction of water levels and currents in coastal areas is critical to the success of various oceanographic operations such as, for example, but not limited to, navigation, amphibious landing, mine warfare and Navy SEAL missions. Some existing coastal forecasting methods can be time-consuming and labor-intensive because model-related tasks and functions require human interactions. What is needed is an automated system to predict high resolution water level and currents at several geographic locations to support activities such as, for example, but not limited to, resource management, navigation safety, facility and structure planning, search and rescue, decision making, and recreational activities, as well as the earlier mentioned U.S. Navy-related operations.

SUMMARY

The system and method of the present embodiment can automatically and regularly predict water level and currents in coastal areas, without operator intervention. The system and method can enable, but are not limited to enabling, automated operational forecasts at regular time intervals without operator intervention by using a computer forecast model that allows accurate prediction of tidal heights and currents in complex shoreline and bathymetry regions, single or parallel processing capability, optimal available processor assignment based on the size of the computing domain, standard and other tidal database forcing for water surface elevation boundary conditions, missing data gap-filling, and river discharge data, wind, bathymetry, and model-derived boundary condition model integration.

The method of the present embodiment for predicting tidal heights and currents using an automated forecast model can include, but is not limited to including, the steps of receiving processing options, automatically creating necessary directories and preparing/updating input files based on the processing options. Databases can include, but are not limited to including, grid database, global bathymetry database, global shoreline database, and global tidal database. The method can generate a wind field and then interpolated wind fields, and thus, fort.22 data, from, for example, but not limited to, the U.S. Navy's Coupled Ocean Atmospheric Mesoscale Prediction System (COAMPS®) model or the U.S. Navy Operational Global Atmospheric Prediction System (NOGAPS) model. The method can generate grid data from a global bathymetry database and a global shoreline database. The method can receive a global tidal database and process tidal potential, specify harmonic constituents and tide boundary conditions to be included in fort.15 data. The method can create a grid for the model domain, and thus, fort.14 data, based on either a software-generated grid or a grid database. The method can create, prepare, and process such data files as, for example, but not limited to, fort.15, fort.14, fort.20, and fort.22 data for parallel computation, and can execute a two-dimensional (2D) or three-dimensional (3D) barotropic hydrodynamic model such as, for example, but not limited to, the Advanced Circulation Model for Shelves, Coastal Seas, and Estuaries (ADCIRC) model to produce, for example, but not limited to fort.61, fort.62, fort.63, and fort.64 displayed, plotted, and archived data.

The system of the present embodiment for predicting tidal heights and currents using an automated forecast model can include, but is not limited to including, a forecast model input creation processor using a generic file and input parameters to produce a grid having data required for the forecast model, a tidal heights and currents prediction processor using a forecast domain to produce water cells and river discharge data, an execution time optimization processor using a forecast model identification and a forecast period to produce optimized input files for the forecast model, a reliability/stability processor using the forecast model ID, an execution ID, and the optimized input files to calculate storage space and access and include interpolated and resulting data from previous model executions, and a forecast model processor providing the grid, the water cells, the river discharge data the optimized input files, the storage space and the resulting data from previous model executions, to the forecast model which produces a forecast of tidal heights and currents, the forecast being stored on a computer-readable medium. The forecast model input creation processor can include, but is not limited to including, a generic file processor creating at least one generic electronic file having information related to the forecast, the generic file processor accepting input parameters related to the forecast, the generic file processor updating the at least one electronic generic file based on the input parameters, a required data processor collecting required data related to the forecast model based on the at least one updated generic file, and a grid processor accessing a grid related to the forecast, the grid processor mapping the required data into the grid, the grid processor providing the grid to the forecast model processor. The required data processor generates a wind field and interpolating the wind field to create fort.22 data, generates grid data from a global bathymetry database and a global shoreline database, prepares tide boundary conditions and tidal potential, including fort.15 data, based on a tidal database, and creates a grid and fort.14 data based on either the grid data or a grid database. The tidal heights and currents prediction processor can include, but is not limited to including, a data structure finder determining a data structure associated with a forecast domain, a river proximity processor automatically locating at least one water cell in the data structure, the data structure being coincident with a river, if a river is located within the forecast domain, or automatically locating the water cell in the data structure having a predetermined water depth and being near the river; a flow rate processor determining river discharge flow rate of the water cell, the flow rate processor converting the flow rate into river discharge data; and a forecast model processor incorporating the water cell and the river discharge data into the forecast model. The execution time optimization processor can include, but is not limited to including, a CPU locator automatically determining an available number of computer processors available for executing the forecasting model, an execution time processor automatically estimating the execution time required to execute the forecasting model on the computer processors based on the available number and the forecast period, an alternatives processor automatically executing an alternative procedure if the execution time is larger than the forecast period, a domain processor automatically partitioning a domain of the forecasting model based on the available number, an input file processor automatically preparing input files for the forecasting model based on the available number, and a forecast model processor automatically initiating the forecasting model on the computer processors based on the input files, the forecast period, and the domain, the forecast model processor automatically receiving a forecast over the forecast period from the forecasting model, the forecast model processor automatically providing the forecast to a computer-readable medium. The reliability/stability processor can include, but is not limited to including, a storage space processor estimating required storage space of a pre-selected execution of the forecast model, the storage space processor determining available storage space for a future execution of the forecast model by comparing the estimated required storage space to available space in the computer system, the storage space processor accessing additional storage space and providing the additional storage space to the forecasting model if the available storage space does not accommodate the forecast model, an interpolator providing needed data to the forecast model processor based on spatial and temporal interpolation of current data if current spatial and temporal data are available, and a previous model execution data processor providing the needed data to the forecast model processor based on resulting data from previous model executions for a maximum of two iterations of the forecast model if current spatial and temporal data are not available. Accessing additional storage space can be accomplished by, for example, but not limited to, compressing information, eliminating information, and awaiting the freeing of storage space.

The computer readable medium of the present embodiment for predicting tidal heights and currents using an automated forecast model can include, but is not limited to including, computer code executing the steps of receiving processing options, automatically creating directories and preparing/updating input files based on the processing options, automatically calculating water cells and river discharge data based on the input files, automatically optimizing the input files for forecast model execution, automatically preparing reliability/stability information based on the forecast model, automatically preparing the water cells, river discharge data, optimized input files, and reliability/stability information as prepared input to the forecast model, automatically providing the prepared input to the forecast model, automatically receiving a forecast from the forecast model, the forecast based on the prepared data, and automatically providing the forecast to a computer readable medium. The computer code executing the step of automatically creating directories can include, but is not limited to, the steps of creating at least one generic electronic file having information related to the forecast, accepting input parameters related to the forecast, updating the at least one electronic generic file based on the input parameters, collecting required data related to the forecast model based on the at least one updated generic file, accessing a grid related to the forecast, mapping the required data into the grid, and providing the grid to the forecast model. The computer code executing the step of calculating water cells and river discharge data can include, but is not limited to including, the steps of determining a data structure associated with a domain of the forecast, if a river is located within the domain, automatically locating the water cells in the data structure coincident with the river, if possible, or automatically locating the water cells in the data structure, the water cells having predetermined water depths and being near the river, determining river discharge flow rates of the water cells, and converting the flow rates into river discharge data. The computer code executing the step of preparing optimized input files can include, but is not limited to including, the steps of automatically determining an available number of computer processors available for executing the forecast model, the forecast model having a forecast period, automatically estimating the execution time required to execute the forecast model on the computer processors based on the available number and the forecast period, automatically executing an alternative procedure if the execution time is larger than the forecast period, automatically partitioning a domain of the forecasting model based on the available number, and automatically optimizing the input files based on the available number. The computer code executing the step of automatically preparing reliability/stability information further can include, but is not limited to including, the steps of estimating required storage space of a pre-selected execution of the forecast model, determining available storage space for a future execution of the forecast model by comparing the estimated required storage space to available space in the computer system, accessing additional storage space and providing the additional storage space to the forecasting model if the available storage space does not accommodate the forecast model, if current spatial and temporal data are available, providing needed data to the forecast model based on spatial and temporal interpolation of current data, and if current spatial and temporal data are not available, providing the needed data to the forecast model based on resulting data from previous model executions for a maximum of two iterations of the forecast model.

BRIEF DESCRIPTION OF THE DRAWINGS

This patent or application file contains at least one drawing executed in color. Copies of this patent or patent application publication with color drawing(s) will be provided by the Office upon request and payment of the necessary fee.

DETAILED DESCRIPTION

The problems set forth above as well as further and other problems are solved by the present teachings. These solutions and other advantages are achieved by the various embodiments of the teachings described herein below.

Figure 1:
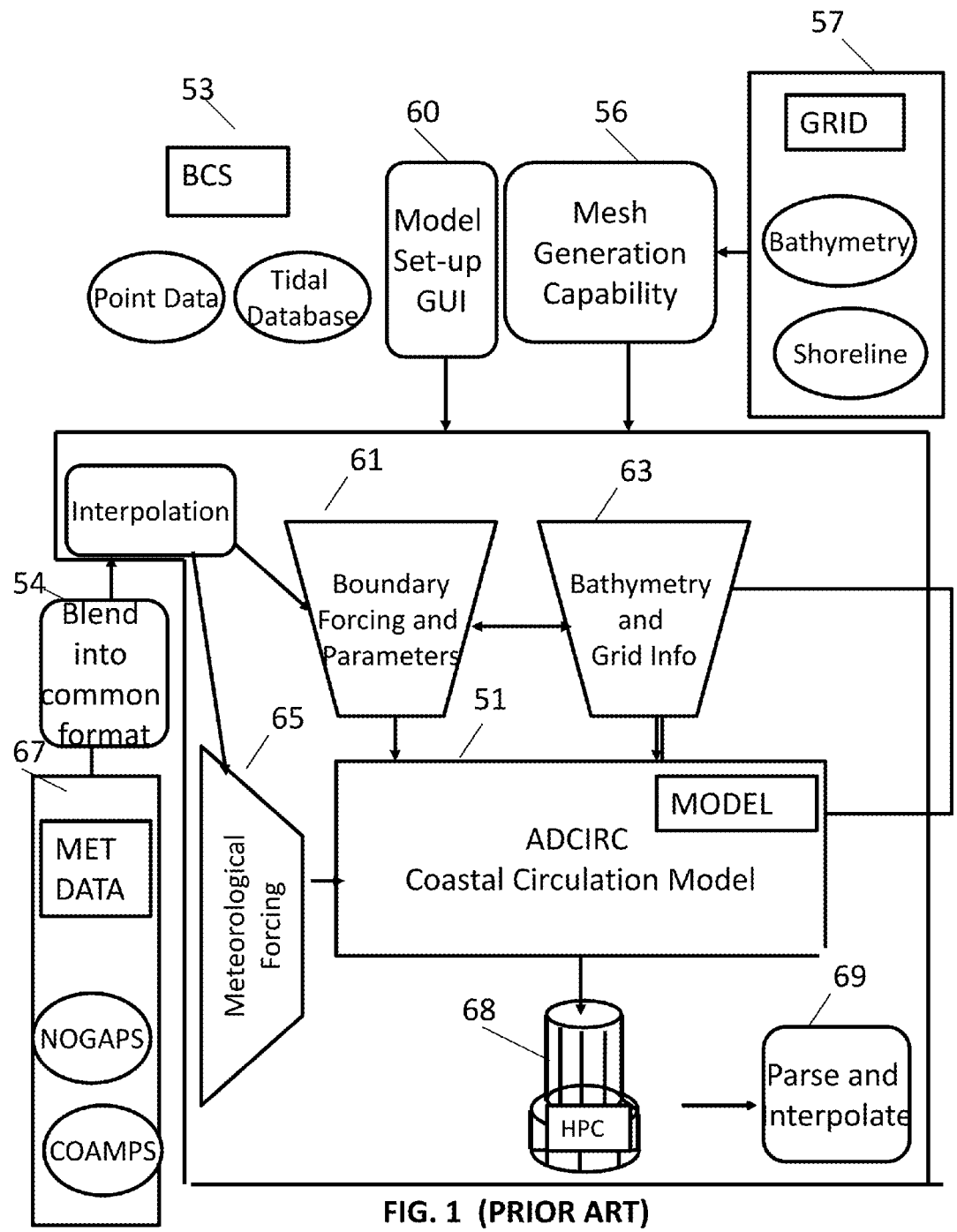
FIG. 1 is a schematic block diagram of the prior art inputs and outputs to an exemplary forecast model.

Referring now to FIG. 1 (Prior Art), in the prior art, inputs to ADCIRC coastal circulation model 51 can include interpolated boundary and forcing parameters 61, bathymetry and grid information 63, and interpolated meteorological forcing data 65. Interpolated boundary forcing parameters 61 can be supplied in a common format by model set-up graphical user interface 60 which can be fed by boundary conditions (BCS) 53. Bathymetry and grid information 63 can be supplied in a common format by mesh generation capability 56, which can be fed by grid data 57. Interpolated meteorological forcing data 65 can be supplied by and blended 54 into a common format by meteorological data sources 67 such as, for example, the COAMPS® model and the NOGAPS model. Data produced by ADCIRC 51 and high performance computer (HPC) 68 can be plotted, disseminated, and archived 69.

Figure 2:
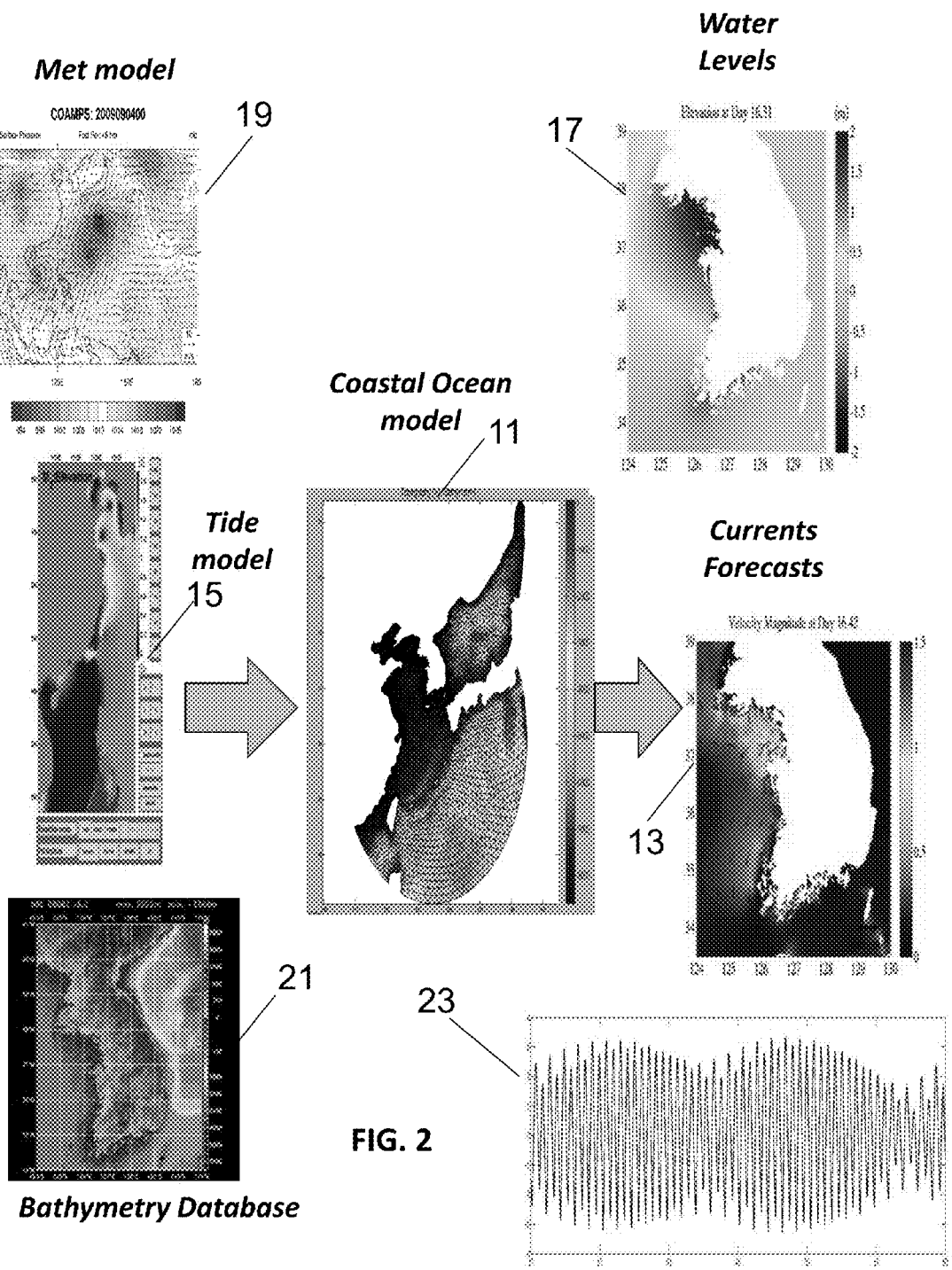
FIG. 2 is a schematic block diagram of the data flow between forecast models of the present teachings.

Referring now to FIG. 2, present forecast models can be adapted and modified to compute timely forecasts in varying geographies. For example, the U.S. Navy requires a relocatable, robust operational coastal forecast system. A relocatable system is a system that can be moved to different geographic regions or scales easily, with minimal changes in computer forecast model configuration. Forecasts of currents 13 can be based on ocean models 11 and tide models 15. However, in coastal and shallow regions, an automated relocatable coastal modeling system is needed that has the capability to make accurate forecasts of water level 17 (also shown in water level time series 23) and currents 13 based on meteorological model 19, ocean model 11, and bathymetry data 21. The system and method of the present embodiment can be used to transition a coastal circulation model into an operational environment by automating tasks of the forecast run stream such as initial setup, acquisition of forcing data, model configuration, and post-processing. In operational environments, operators may have limited time to set-up and configure models in a new region and make predictions to support missions. Therefore, the capability of the system and method of the present embodiment to configure the forecast model quickly allows for automatically generated model simulations and predictions with minimal human intervention. The system and method of the present embodiment can resolve open boundary specifications and provide timely grid generation for models. With respect to timely grid generation, the grids for several strategic geographic regions are generated in advance and stored in a grid database, and the system and method of the present embodiment can incorporate a grid generation tool for areas not available in the database. The system and method of the present embodiment can also incorporate surface forcing, meteorological wind, and atmospheric pressure fields provided by a mesoscale meteorological model such as, for example, but not limited to, the COAMPS® software. In the present embodiment, scripting programs can be used to integrate individual modeling components such as, but not limited to, meteorological model 19, tide model 15, and coastal ocean model 11 to automate tasks such as creating and configuring model input files, acquiring surface atmospheric forcing data and open boundary tidal information, checking model run status, reporting model run status, post-processing and mapping final products. In the present embodiment, coastal ocean model 11 can include an unstructured grid system that allows modeling complex coastal regions at fine spatial scale. The core coastal circulation model in the system, for example, is the three-dimensional, finite-element based hydrodynamic model ADCIRC. ADCIRC uses an unstructured grid that allows modeling complex coastal regions at a fine spatial scale. With properly specified topography/bathymetry, meteorological forcing, tidal potential and boundary forcing, this model can accurately simulate water levels 17 (see also water level time series 23), currents 13, and consequently the area of inundation due to wind, tides, or other forcing. In the present embodiment, coastal ocean model 11 can be parallelized using, for example, but not limited to, the Message Passing Interface (MPI) protocol and metis domain partitioning software. The code structure of the present embodiment can be, but is not limited to being, modular with individual subroutines containing global dimensioning, cold and hot start initialization, parameter specification, wind forcing, harmonic analysis, two- or three-dimensional calculations, and the main time stepping loop. Furthermore, the code can be multi-algorithmic with options for selecting various implementations of, for example, but not limited to, the conservative or nonconservative Generalized Wave Continuity Equation (GWCE) and/or momentum equation formulations.

The system of the present embodiment can use a database concept to make available pre-existing unstructured meshes for the coastal circulation model. Spatially varying, high resolution finite element grids can be used by the coastal circulation model to represent complex coastal regions. In the database concept, grids for several preselected regions can be created and stored in the database. In addition, a grid generation and editing tool, such as, for example, the tool described in United States Patent Publication 2010/0094597, and incorporated herein in its entirety by reference, can be included in the system to allow creation of grids for areas not available in the existing grid database.

Figure 3:
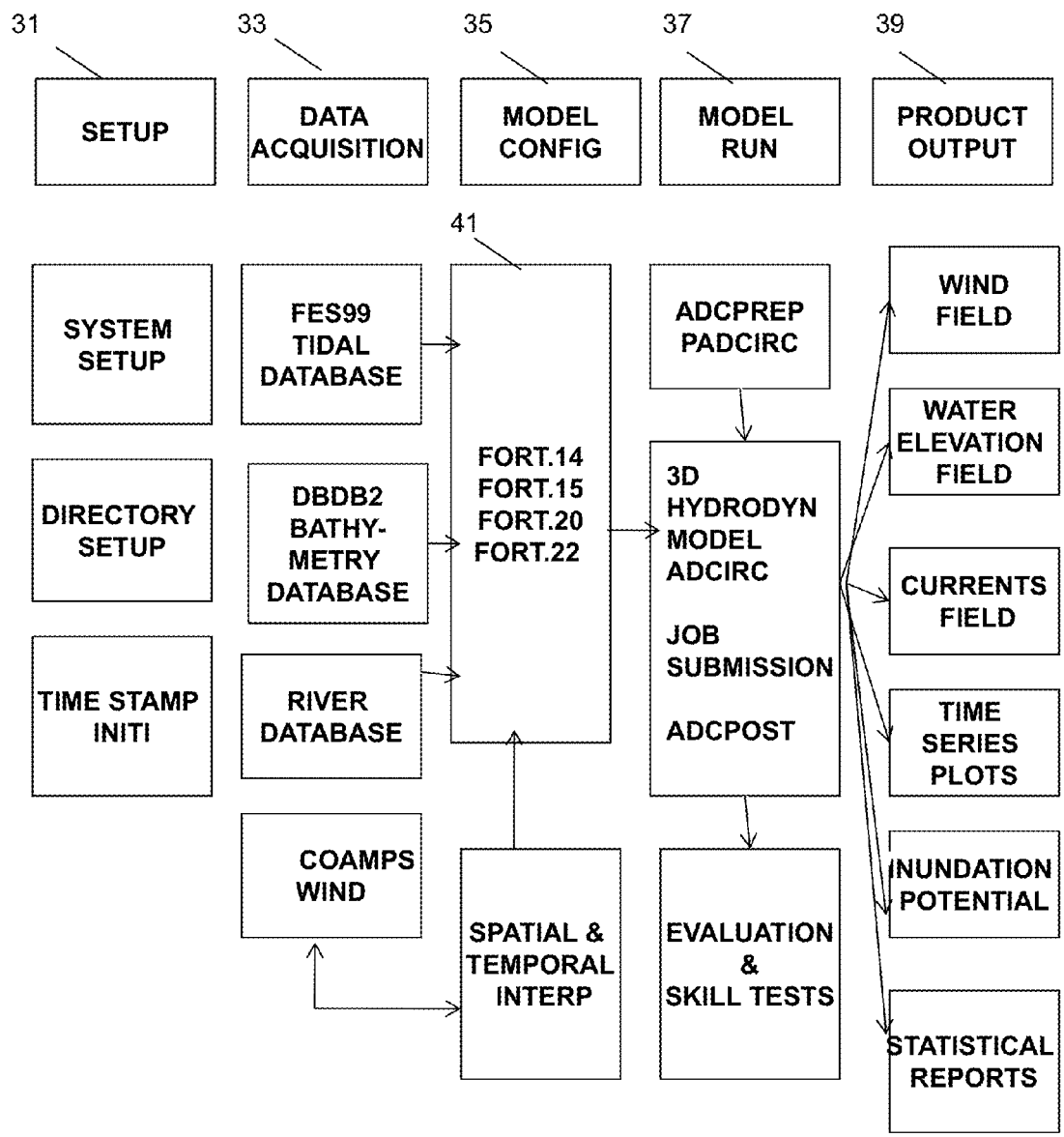
FIG. 3 is a schematic block diagram of the components, functions, and data of the prediction system of the present teachings.

Referring now to FIG. 3, the system and method of the present embodiment can be implemented by, for example, but not limited to, shell scripts, awk scripts, Perl programs, C programs, Fortran programs and third-party software. Each program can be designed to serve a specific purpose or accomplish a particular task. Programs and scripts can be grouped into, for example, but not limited to, five modules according to their functions: 1) system setup 31, 2) data acquisition 33, 3) model configuration 35, 4) model run 37, and 5) output product generation and dissemination/output 39. Scripts and modules can be designed to be manually invoked from the command line if errors are found or if a scheduled task is not completed. Thus manual processing can be accommodated if, for example, input files 41 at the time of execution are missing or incomplete. System setup 31 can set up the operating system's environmental variables, create proper file directory structures, and initialize starting and ending timestamps.

Continuing to refer to FIG. 3, data acquisition 33 can collect and process incoming data for the modeling system. Data acquisition 33 can, for example, but not limited to, download data from remote servers and convert the data into input files 41 that are compatible with the ocean circulation model. Such files can include, but are not limited to including, meteorological wind forcing, and open boundary tidal information. As an example, the u- and v-components of wind velocity and the pressure fields can be extracted from the Western Pacific region (W_PAC) COAMPS® standard 27-km data at 3-hr intervals. As a further example, an option for accepting nested high resolution COAMPS® fields (9-km or 3-km) can be provided. Data acquisition 33 can interpolate input files 41 to create spatially and temporally appropriate and continuous high resolution meteorological fields. After the unstructured mesh is finalized, data acquisition 33 can extract and save locations of mesh nodes that can be used to identify exact locations of parameters of interest for the analysis time and forecasts desired. The locations can be saved in, for example, but not limited to, an ASCII text file. These data can be used to provide, for example, surface elevation and normal river discharge data boundary conditions for ocean circulation model forcing.

Continuing further to refer to FIG. 3, model configuration 35 can create, but is not limited to creating, ocean circulation model input files 41, for example, but not limited to, a grid/bathymetry file (e.g. fort.14 and FIGS. 11 and 12), a model parameter file (e.g. fort.15), river discharge data boundary forcing file (e.g. fort.20), and a surface meteorological forcing file (e.g. fort.22). In addition, model configuration 35 can prepare the model for execution and process data resulting from the model execution. In an exemplary embodiment, a grid/bathymetry file can be copied from a grid database to the local directory and renamed fort.14 to interface directly with ocean circulation model input file units. Fort.15 includes model configuration and parameter information. Fixed parameters can be saved in a template file (e.g. fort.15) while run-specific variables such as starting time, run period or user specified parameters can be appended to the template file. In the exemplary embodiment, fort.15 can be updated for each simulation, and fort.22 can be created based the data interpolated from aggregated wind data.

Continuing to further refer to FIG. 3, model run 37 can prepare software that causes the model to execute on parallel processors, can prepare software that performs domain partitioning, can create sub-directories based on the number of parallel processors, and can copy files to directories based on the partitioning. Model run 37 can further cause the model to be executed in parallel using, for example, but not limited to, the MPI or OpenMPI implementation. Model run 37 can put all regionalized output from the model into global files, and can create default input template files that can be used to run the model in an automated batch mode or interactively in the case where the hardware platform or the number of processors needs to be changed.

Continuing to still further refer to FIG. 3, model run 37 can receive information from model configuration 35 and can execute the model, possibly on a separate hardware processor from any or all of system setup 31, data acquisition 33, model configuration 35, and product output 39. Product output 39 can generate, disseminate, and archive map products and model outputs. Product output 39 can invoke software and mapping routines based on user preferences. Product output 39 can provide map products to, for example, but not limited to, a web server and the Internet for the end user use. Mapped products can include, but are not limited to including, graphical maps of forecast wind fields (speed and directions), water elevations in contours (e.g. FIG. 13) and currents with arrows showing directions, and color coding indicating magnitudes (e.g. FIG. 14). Time series of water levels (e.g. FIG. 15) and currents (e.g. FIG. 16) at specific locations can also be produced. Statistical metrics such as root mean square error (RSME), mean absolute error (MAE), correlation coefficient (R), and standard deviation (SD) can be computed based on user preferences.

Figure 4:
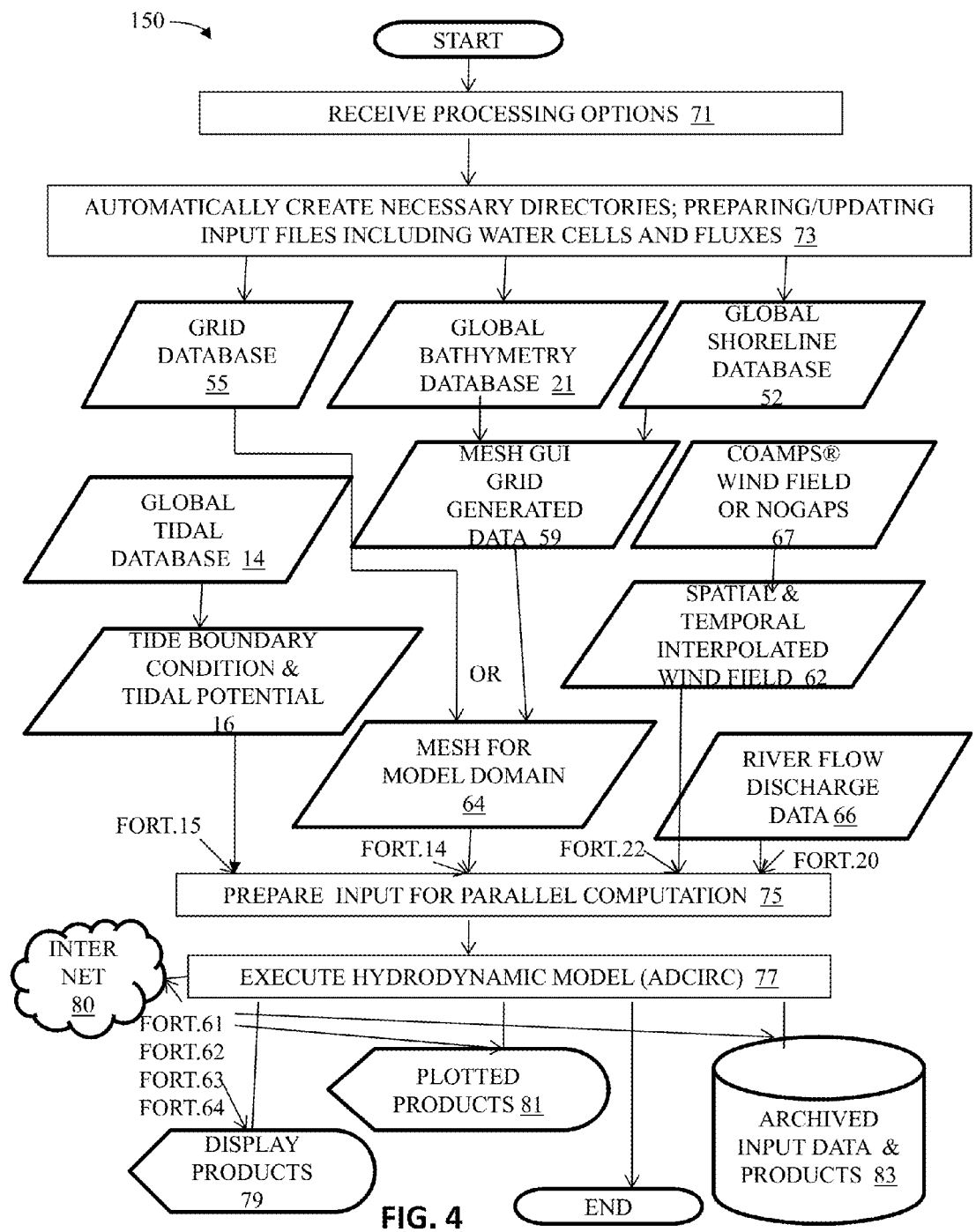
FIG. 4 is a flowchart/data flow of the components of an embodiment of the system of the present teachings.

Referring now to FIG. 4, method 150 for predicting tidal heights and currents using an automated forecast model can include, but is not limited to including, the steps of receiving 71 processing options, automatically creating 73 necessary directories and preparing/updating input files based on the processing options. Databases can include, but are not limited to including, grid database 55, global bathymetry database 21, global shoreline database 52, and global tidal database 14. Method 150 can generate a meteorological data 67 and interpolated wind fields 62, and thus, fort.22 data, from, for example, but not limited to, the COAMPS® model or the NOGAPS model. Method 150 can generate grid data 59 from global bathymetry database 21 and global shoreline database 52. Method 150 can process global tidal database 14 to prepare tide boundary conditions and tidal potential 16 including fort.15 data. Method 150 can create model domain grid 64, and thus, fort.14 data, based on either grid generated data 59 or grid database 55, and can create river flow river discharge data 66, and thus, fort.15 data. Method 150 can process 75, for example, but not limited to, fort.15, fort.14, fort.20, and fort.22 data for parallel computation, and can execute 77 a 2D or 3D barotropic hydrodynamic model such as, for example, but not limited to ADCIRC to produce, for example, but not limited to fort.61, fort.62, fort.63, and fort.64 displayed products 79, plotted products 81, internet 80 products, and archived input data and products 83.

Figure 5:
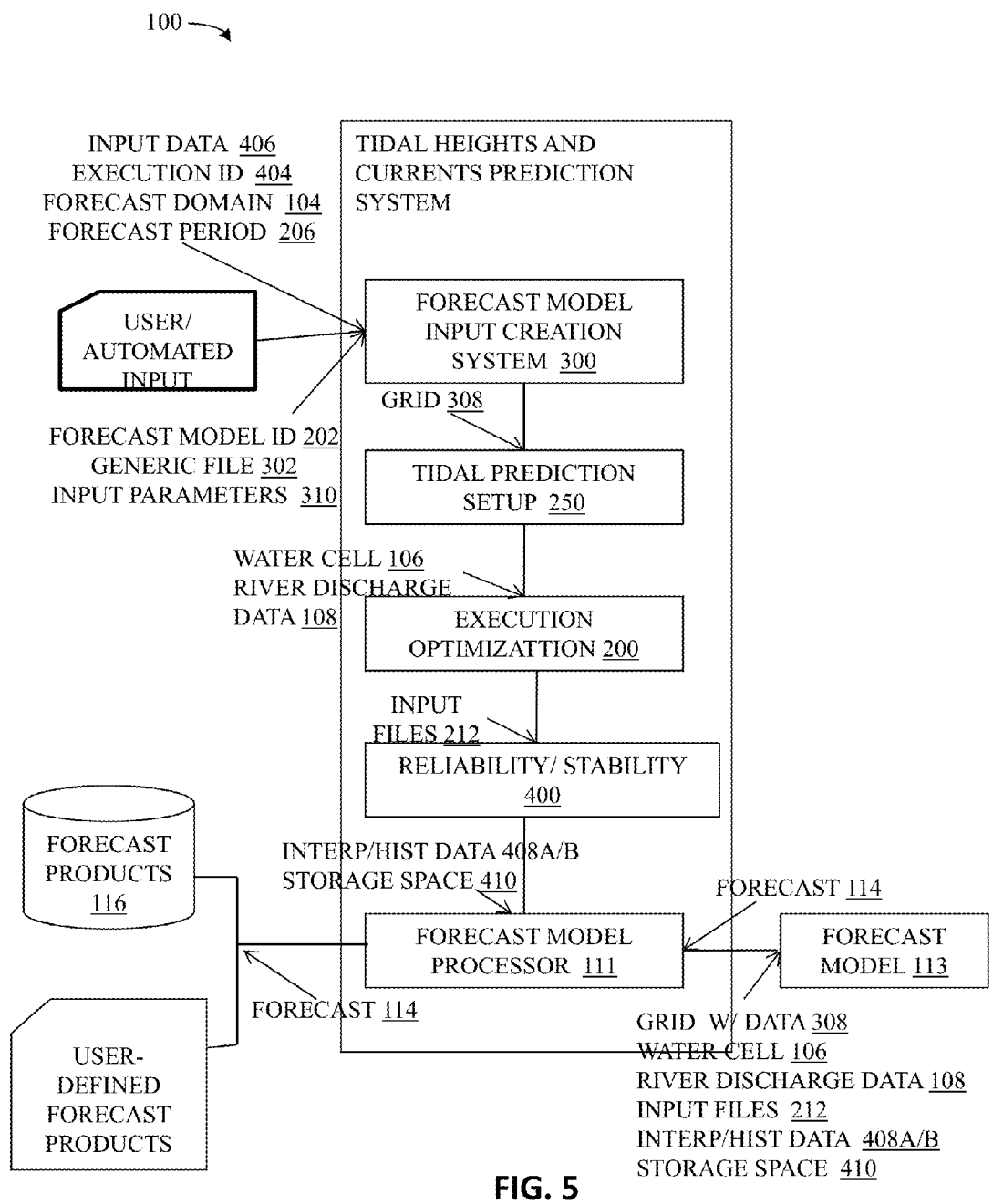
FIG. 5 is a schematic block diagram of the tidal heights and currents prediction system of the present teachings.

Referring now to FIG. 5, prediction system 100 for preparing for execution of forecast model 113 can include, but is not limited to including, forecast model input creation processor 300 (see FIG. 6) for using generic file 302 and input parameters 310 to produce grid 308 having the needed data. System 100 can also include tidal heights and currents prediction processor 250 (see FIG. 8) for using geographic domain 104 to produce water cell 106 and river discharge data 108. System 100 can also include execution time optimization processor 200 (see FIG. 9) for using forecast model identification (ID) 202 and forecast period 206 to produce input files 212. System 100 can still further include reliability/stability processor 400 (see FIG. 10) for using forecast model ID 202, execution ID 404, and model input data 406 to produce storage space 410, interpolated data 408A and resulting data from previous model executions 408B. System 100 can also include forecast model processor 111 for receiving what each stated component produces and passing those inputs to forecast model 113 which produces forecast 114 that is stored as forecast products 116 and provided to the user.

Figure 6:
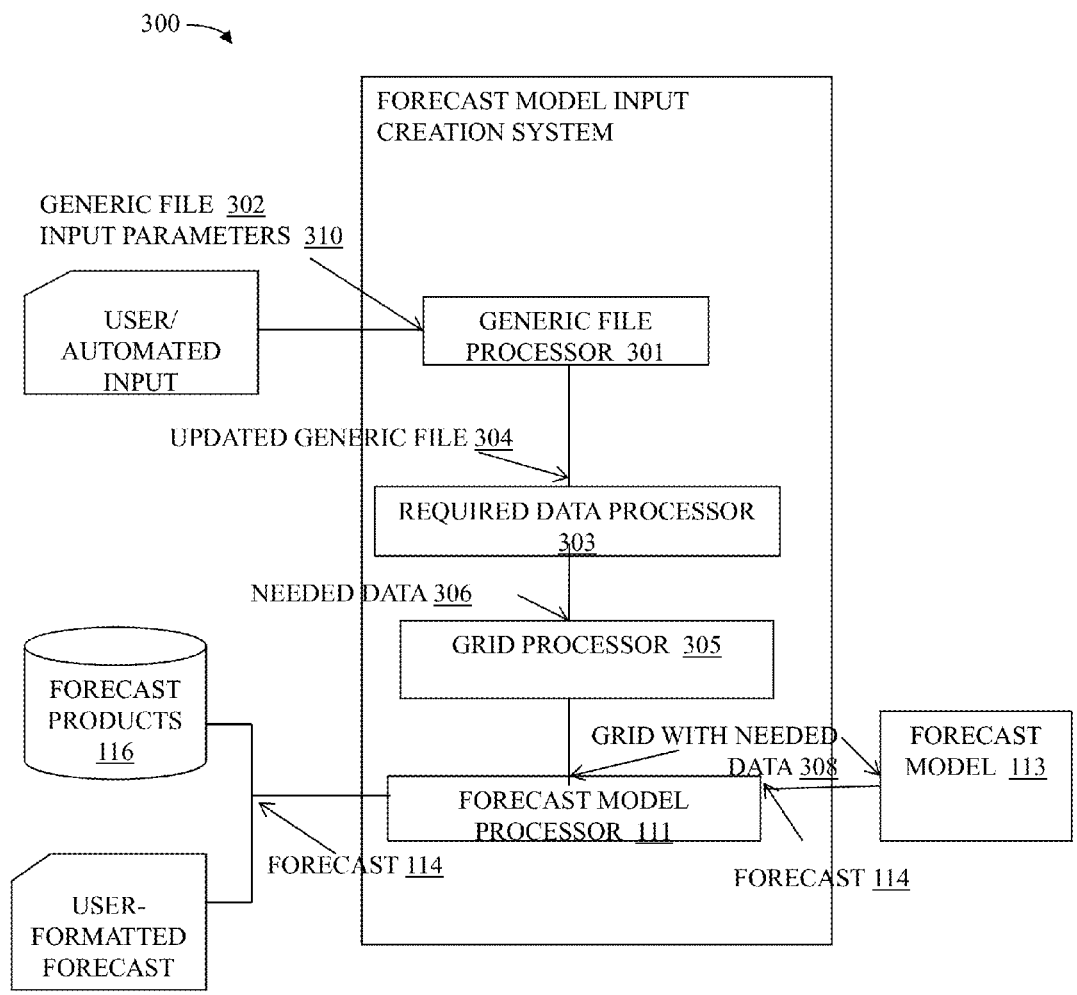
FIG. 6 is a schematic block diagram of the forecast model input creation system of the present teachings.

Referring now to FIG. 6, forecast model input creation processor 300 for creating input for forecast model 113 can include, but is not limited to including, generic file processor 301 for creating at least one generic electronic file 302 having electronic information related to forecast 114, accepting input parameters 310 related to forecast 114, and updating at least one generic electronic file 302 based on input parameters 310. Forecast model input creation processor 300 can also include required data processor 303 for collecting needed data 306 related to automated forecast model 113 based on the at least one updated generic electronic file 304. Forecast model input creation processor 300 can further include grid processor 305 for accessing a grid related to forecast 114, and mapping needed data 306 to into the grid. Forecast model input creation processor 300 can also include forecast model processor 111 for providing grid with needed data 308 to automatic forecast model 113, receiving forecast 114 from automatic forecast model 113, and providing forecast 114 to a computer readable medium such as, for example, forecast products 116 and in user-formatted form.

Corresponding to forecast model input creation processor 300 of FIG. 6, a method for creating input to an automated forecasting model for preparing a forecast can include, but is not limited to including, the steps of creating at least one generic electronic file having electronic information related to the forecast, accepting input parameters related to the forecast, updating the at least one generic electronic file based on the input parameters, collecting required data related to the automated forecast model based on the at least one updated generic electronic file, accessing a grid related to the forecast, mapping the required data to into the grid, and providing the grid to the automatic forecasting model.

Figure 7:
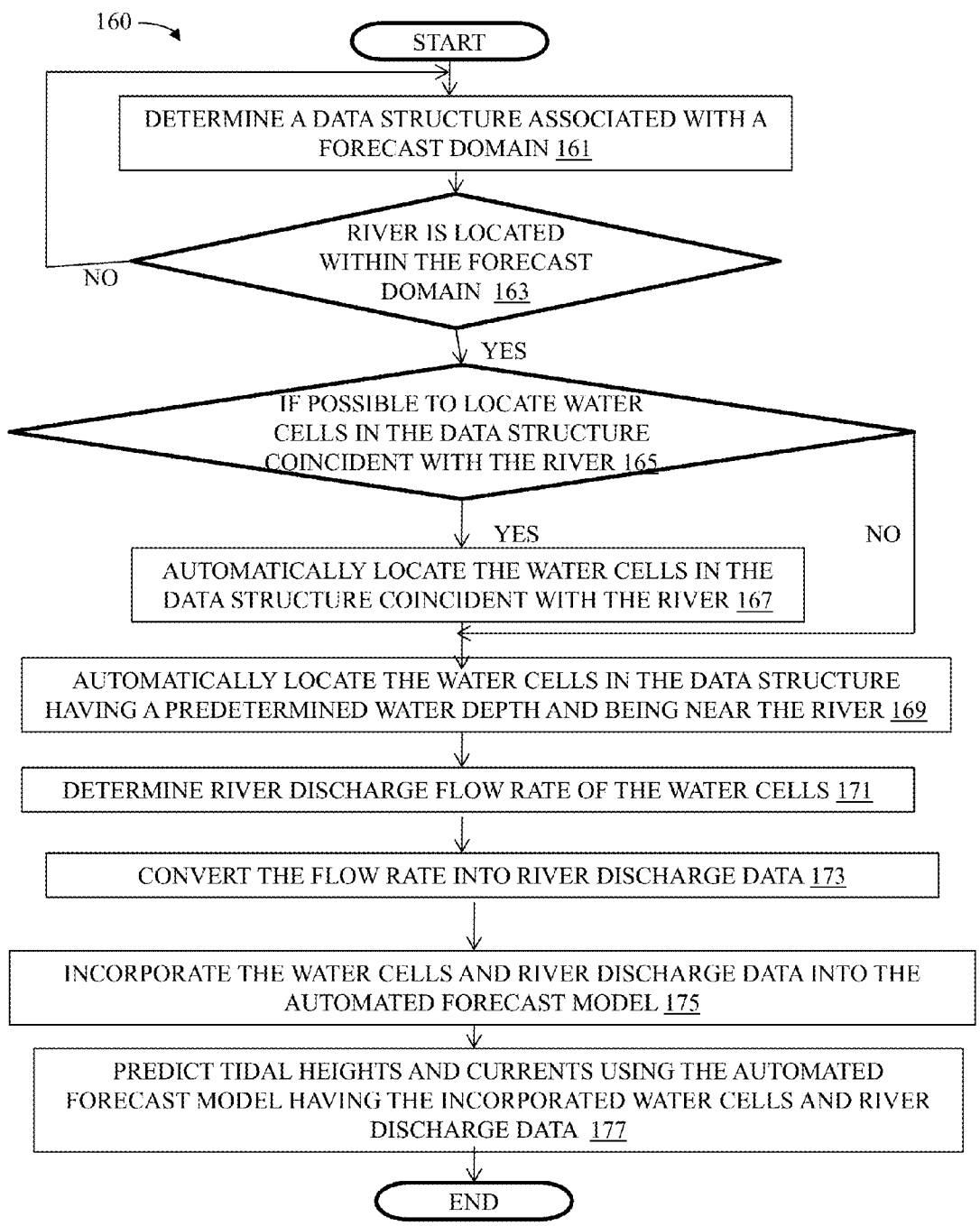
FIG. 7 is a flowchart of the method of the river discharge data forcing system of the present teachings.

Referring now to FIG. 7, method 160 for predicting river discharge data forcing using an automated forecast model can include, but is not limited to including, the step of determining 161 a data structure associated with a forecast domain. If 163 a river is located within the forecast domain, and if 165 it is possible to locate a water cell in the data structure coincident with the river, method 160 can automatically locate 167 a water cell in the data structure coincident with the river. If 165 it is not possible to locate a water cell in the data structure coincident with the river, method 160 can automatically locate 169 the water cell in the data structure having a predetermined water depth and being near the river. Method 160 can further determine 171 a river discharge flow rate and distribute to the water cells, convert 173 the flow rate into river discharge data, incorporate 175 the water cells and the river discharge data into the automated forecast model, and predict 177 tidal heights and currents using the automated forecast model.

Figure 8:
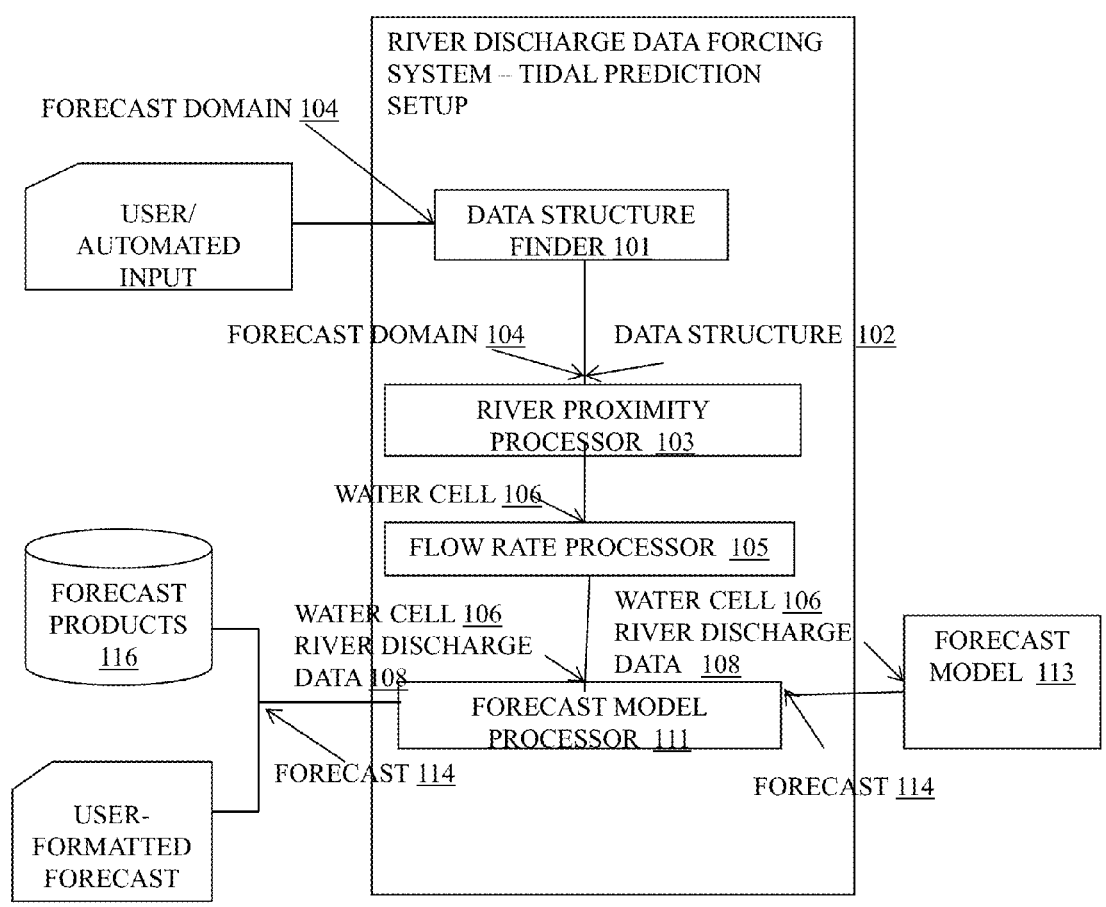
FIG. 8 is a schematic block diagram of the river discharge data forcing system of the present teachings.

Referring now to FIG. 8, one requirement in developing an operational modeling system is to automate routine tasks as much as possible while still maintaining system flexibility and allowing manual override. To meet this requirement, the system and method of the present embodiment integrate individual modeling components and automate tasks such as configuring model input files, acquiring surface wind forcing data and open boundary tidal information, checking model run status, reporting model run status, post-processing and mapping final products. In particular, several aspects of the system, depicted in FIGS. 6, 8, 9, and 10, have been automated to supply the forecasting model with timely relevant data. FIG. 8 depicts river discharge data forcing system 250 for providing river discharge data forcing to an automated forecast model. River discharge data forcing system 250 can include, but is not limited to, including data structure finder 101 for determining data structure 102 associated with geographic domain 104. River discharge data forcing system 250 can also include river proximity processor 103 for determining if a river is located within geographic domain 104, and if it is possible to locate a water cell in data structure 102 that is coincident with the river. River proximity processor 103 can automatically locate water cell 106 in data structure 102 coincident with the river. If it is not possible to locate water cell 106 in data structure 102 coincident with the river, river proximity processor 103 can automatically locate water cell 106 in data structure 102 having a predetermined water depth and being near the river. River discharge data forcing system 250 can further include flow rate processor 105 for determining a river discharge flow rate of water cell 106 and convert the flow rate into river discharge data 108. River discharge data forcing system 250 can still further include forecast model processor 111 for incorporating water cell 106 and river discharge data 108 into automated forecast model data, and providing automated forecast model data to forecast model 113. Forecast model processor 111 can receive, from forecast model 113, tidal heights and currents forecast 114, and provide forecast 114 to forecast products 116 and as user-formatted forecasts.

Figure 9:
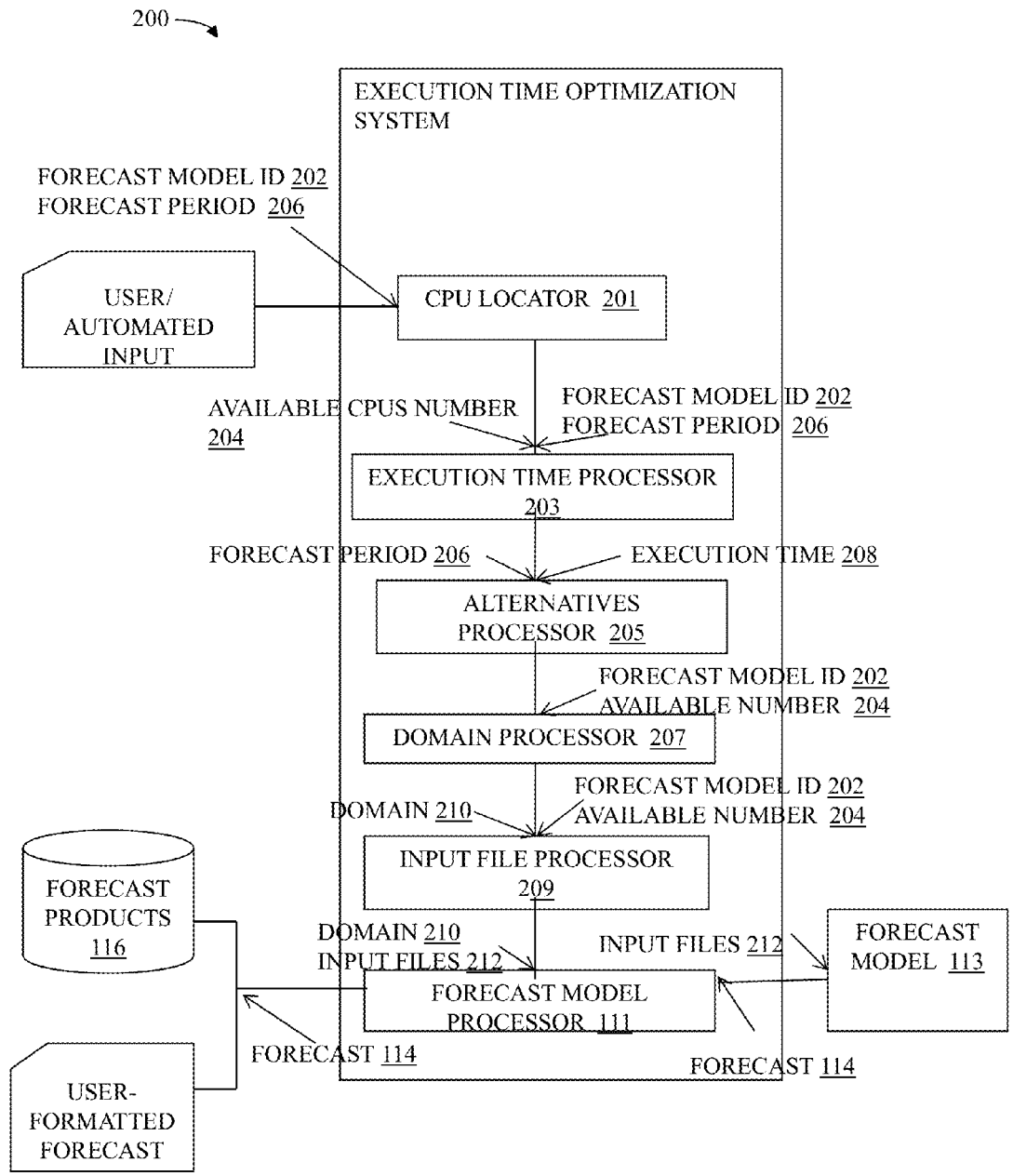
FIG. 9 is a schematic block diagram of the execution time optimization system of the present teachings.

Referring now to FIG. 9, execution time optimization system 200 optimizing execution time of a forecasting model having a forecast period can include, but is not limited to including, Central Processing Unit (CPU) locator 201 for automatically determining an available CPU number 204, the number of CPUs available for executing forecast model 113 having forecast model ID 202 during forecast period 206. Execution time optimization system 200 can also include execution time processor 203 for automatically estimating the execution time 208 required to execute forecast model 113 on the CPUs based on available number of CPUs 204 and forecast period 206. Execution time optimization system 200 can also include alternatives processor 205 for automatically executing an alternative procedure if execution time 208 is larger than forecast period 206. Execution time optimization system 200 can still further include domain processor 207 for automatically partitioning domain 210 of forecast model 113 based on available number 204. Execution time optimization system 200 can also include input file processor 209 for automatically preparing input files 212 for forecast model 113 based on available number of CPUs 204. Execution time optimization system 200 can also include forecast model processor 211 for automatically initiating forecast model 113 on the CPUs based on input files 212, forecast period 206, and domain 210. Forecast model processor 111 can also automatically receive forecast 114 over forecast period 206 from forecast model 113, and can automatically provide forecast 114 to a computer-readable medium such as, for example, forecast products 116 and as a user-formatted forecast.

Corresponding to execution time optimization system 200 of FIG. 9, a method for optimizing execution time of a forecasting model having a forecast period can include, but is not limited to including, the steps of (a) automatically determining an available number of CPUs available for executing the forecasting model, (b) automatically estimating the execution time required to execute the forecasting model on the CPUs based on the available number of CPUs and the forecast period, (c) automatically executing an alternative procedure if the execution time is larger than the forecast period, (d) automatically partitioning a domain of the forecasting model based on the available number of CPUs, (e) automatically preparing input files to the forecasting model based on the available number of CPUs, (f) automatically initiating the forecasting model on the CPUs based on the input files, the forecast period, and the domain, (g) automatically receiving a forecast over the forecast period from the forecasting model, and (h) automatically providing the forecast to a computer-readable medium. The alternative procedure can include, but is not limited to including, the step of repeating steps (a), (b), and (c). The alternative procedure can include, but is not limited to including, the steps of waiting for a pre-selected amount of time, and repeating steps (a), (b), and (c). The method can optionally include the steps of receiving selection of a region associated with the forecast, retrieving a grid associated with the region if the grid is available, creating the grid if the grid is not available, and providing the grid to the forecasting model. The method can further optionally include the step of creating input to a forecasting model for preparing a forecast including, but not limited to, the steps of creating at least one generic file having information related to the forecast, accepting input parameters related to the forecast, updating the at least one generic file based on the input parameters, collecting required data related to the forecast model based on the at least one updated generic file, accessing a grid related to the forecast, mapping the required data onto the grid; and providing the grid to the forecasting model. The method can further optionally include the step of enabling automatic reliability and stability in the forecasting model executing in a computer system including the steps of estimating required storage space of a pre-selected execution of the forecasting model, determining available storage space for a future execution of the forecasting model by comparing the estimated required storage space to available space in the computer system, receiving instructions for accessing additional storage space and providing the additional storage space to the forecasting model if the available storage space does not accommodate the forecasting model, if current spatial and temporal data are available, providing data to the forecasting model based on spatial and temporal interpolation of data, and if current spatial and temporal data are not available, providing the data to the forecasting model based on resulting data from previous model executions for a maximum of two iterations of the forecasting model.

Figure 10:
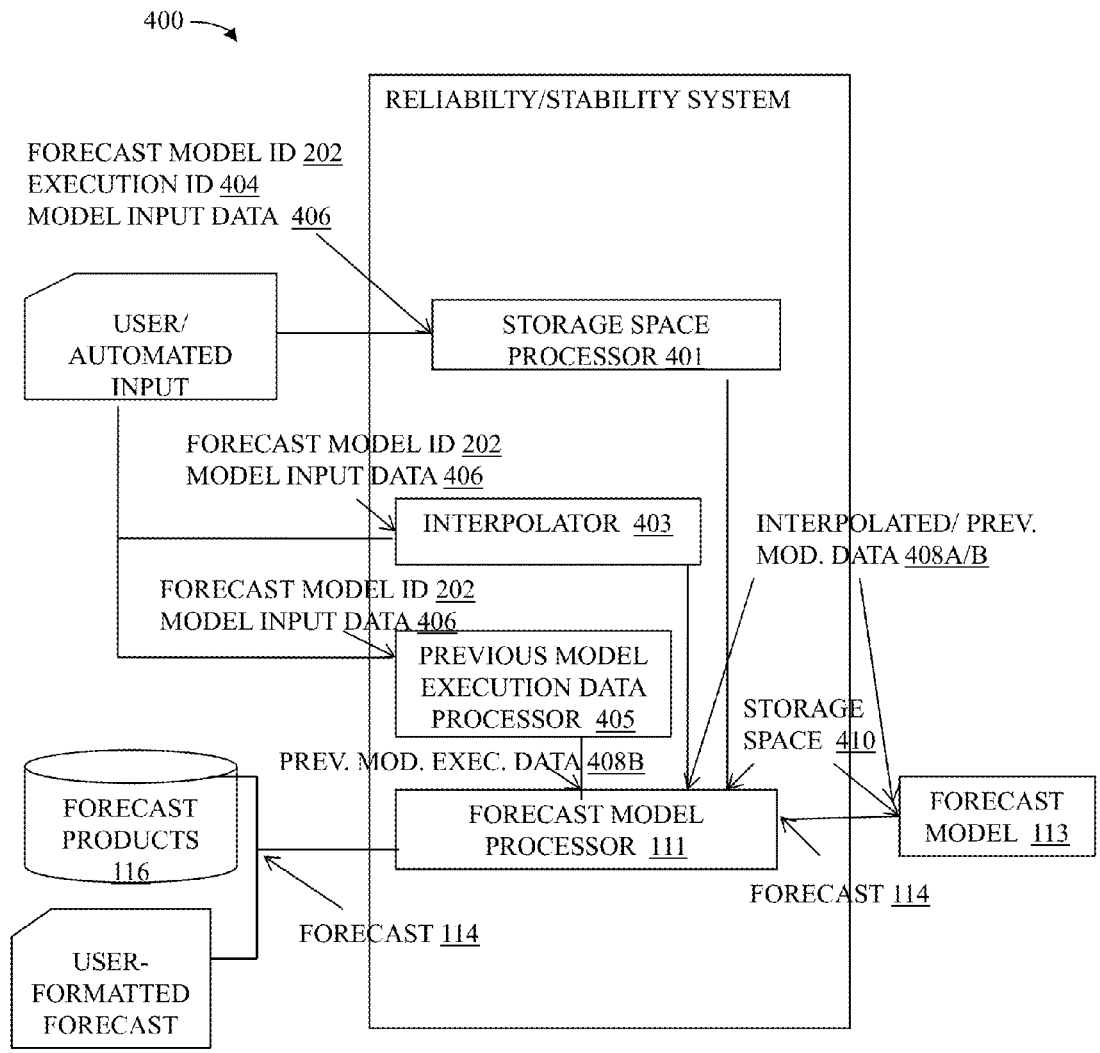
FIG. 10 is a schematic block diagram of the reliability/stability system of the present teachings.

Referring now to FIG. 10, reliability/stability processor 400 for enabling automatic reliability and stability in an automated forecasting model executing in a computer system can include, but is not limited to including, storage space processor 401 for estimating required storage space of a pre-selected execution ID 404 of automated forecast model 113, determining available storage space for a future execution of automated forecast model 113 by comparing the estimated required storage space to available space in the computer system, and accessing additional storage space 410 and providing additional storage space 410 to automated forecast model 113 if the available storage space does not accommodate automated forecast model 113. Reliability/stability processor 400 can also include interpolator 403 for providing missing data to automated forecast model 113 based on spatial and temporal interpolation of current data, if current spatial and temporal data are available. Reliability/stability processor 400 can further include resulting data from previous model executions processor 405 for providing the missing data to automated forecast model 113 based on resulting data from previous model executions for a maximum of two iterations of automated forecast model 113 if current spatial and temporal data are not available. Reliability/stability processor 400 can further include forecast model processor 111 and either interpolated data 408A or resulting data from previous model executions 408B, and providing them to automated forecast model 113. Forecast model processor 111 can also receive forecast 114 from automatic forecast model 113, and provide forecast 114 to a computer readable medium such as, for example, forecast products 116 and in user-formatted form.

Corresponding to reliability/stability processor 400 of FIG. 10, a method for enabling automatic reliability and stability in an automated forecasting model executing in a computer system can include, but is not limited to including, the steps of estimating required storage space of a pre-selected execution of the automated forecasting model, determining available storage space for a future execution of the automated forecasting model by comparing the estimated required storage space to available space in the computer system, receiving instructions for accessing additional storage space and providing the additional storage space to the automated forecasting model if the available storage space does not accommodate the automated forecasting model, if current spatial and temporal data are available, providing data to the automated forecasting model based on spatial and temporal interpolation of current data, and if current spatial and temporal data are not available, providing the data to the automated forecasting model based on interpolated or resulting data from previous model executions for a maximum of two iterations of the automated forecasting model.

Figure 11:
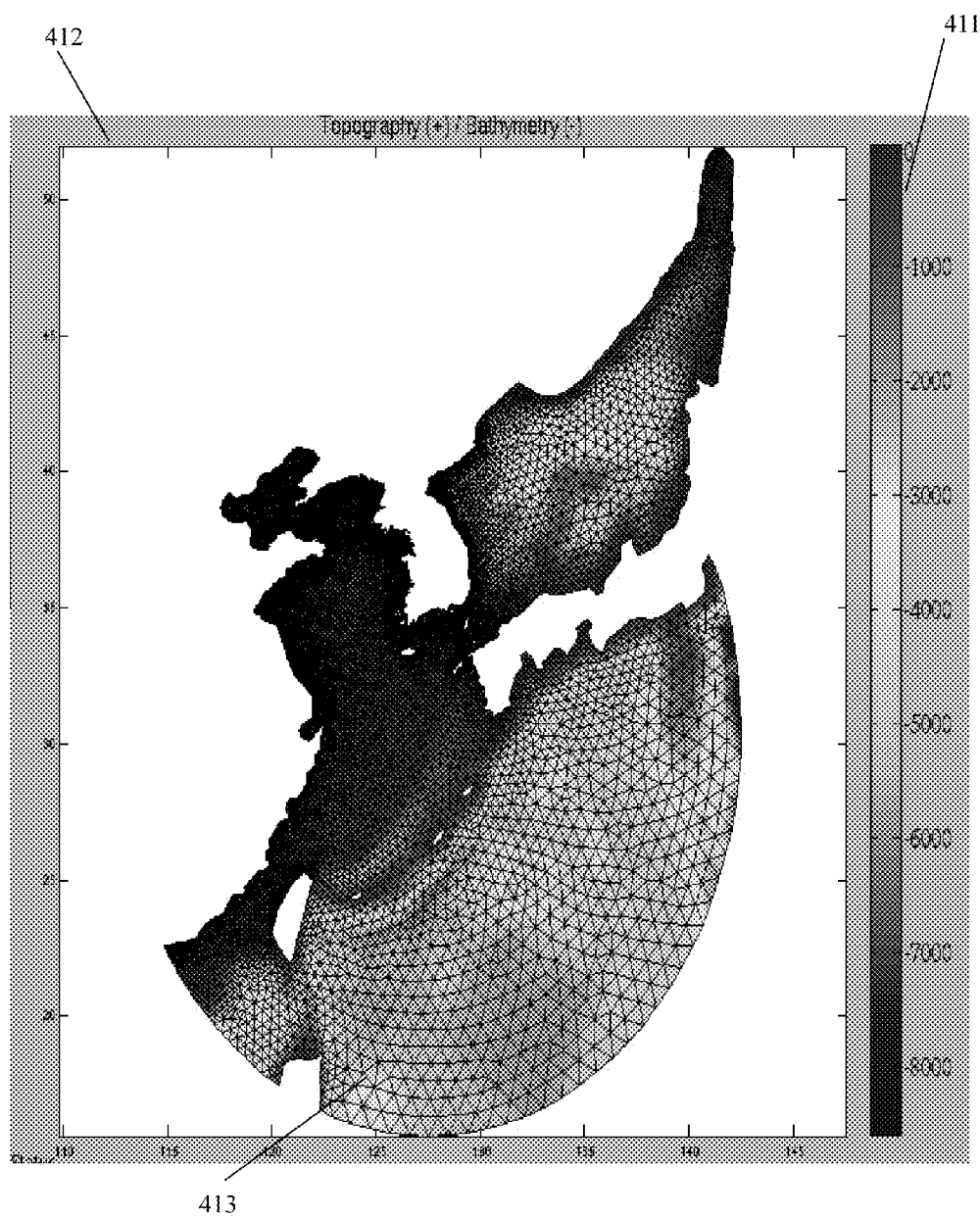
FIG. 11 is a pictorial view of an ocean model bathymetric database product created according to the present teachings.
Figure 12:
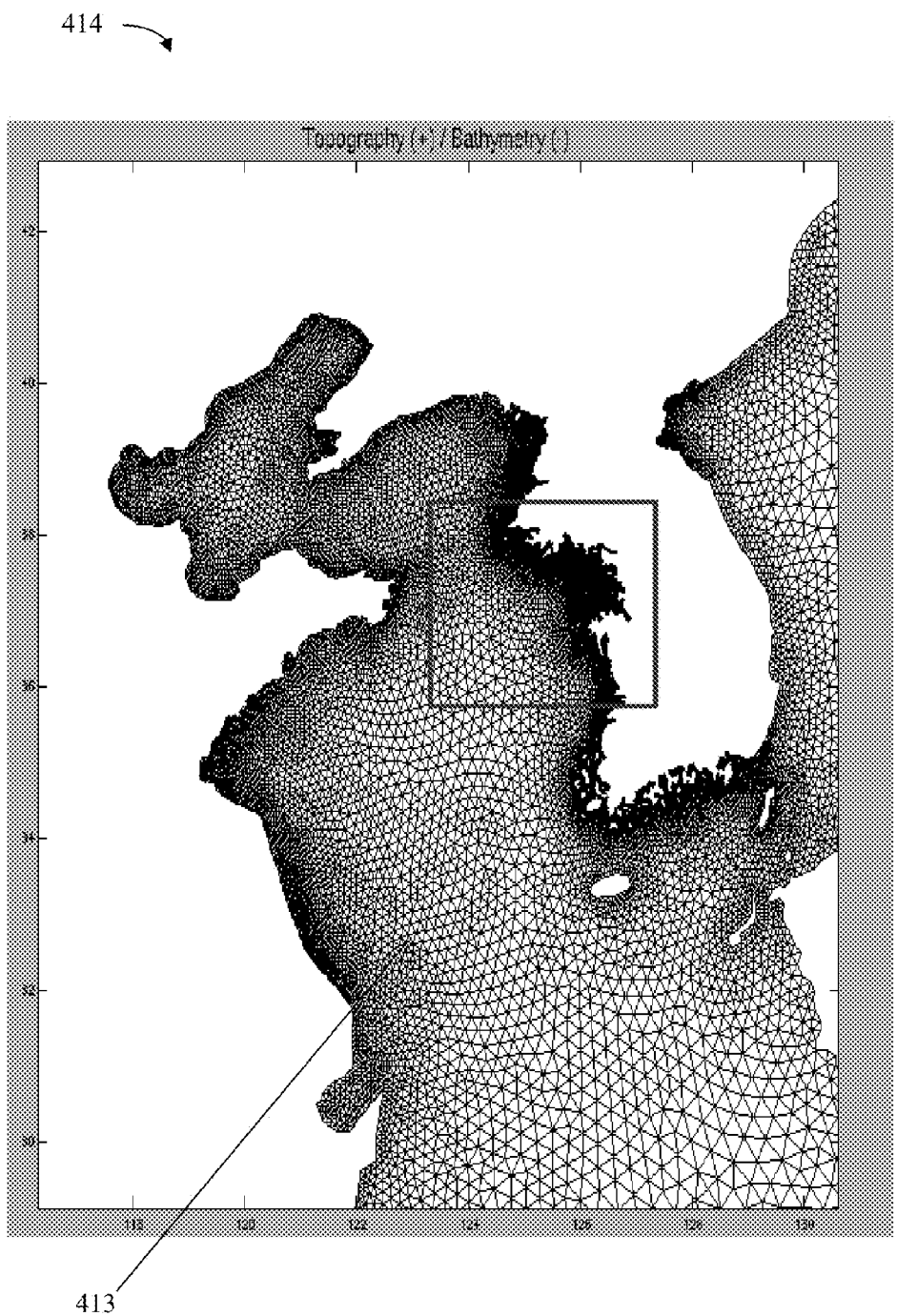
FIG. 12 is a pictorial view of the product of FIG. 11 expanded according to the present teachings.

Referring now primarily to FIGS. 11 and 12, finite element grid 412 having 26,752 nodes, 49,313 elements, and a 600 m finest spatial resolution is shown (FIG. 11) and expanded 414 (FIG. 12) depicting bathymetric data 413 from bathymetric database 21 (FIG. 2) as a product of the embodiments of the present teachings. FIG. 11 shows topography/bathymetry scale 411.

Figure 13:
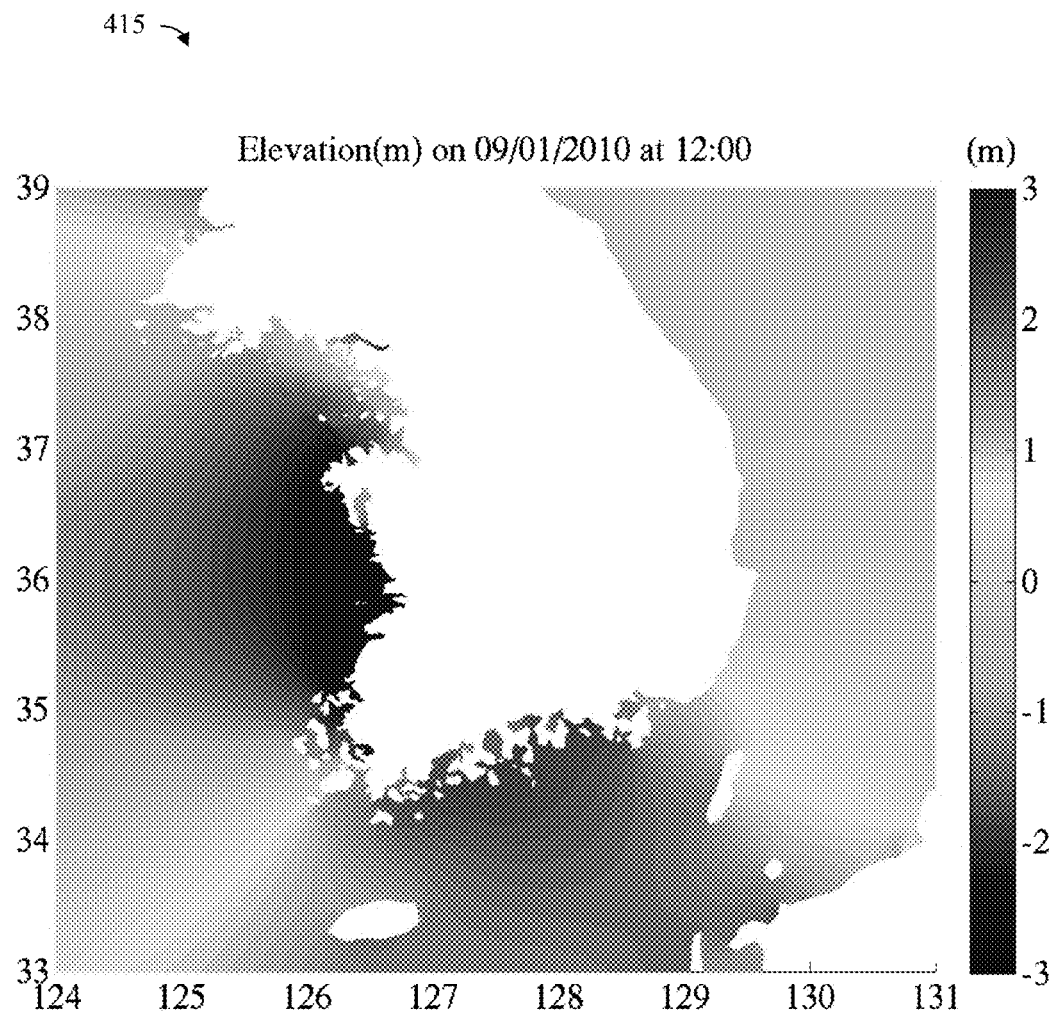
FIG. 13 is a pictorial view of the water elevation product created according to the present teachings.

Referring now to FIG. 13, water elevation 415 in meters for Sep. 1, 2010, is shown as a product of the embodiments of the present teachings.

Figure 14:
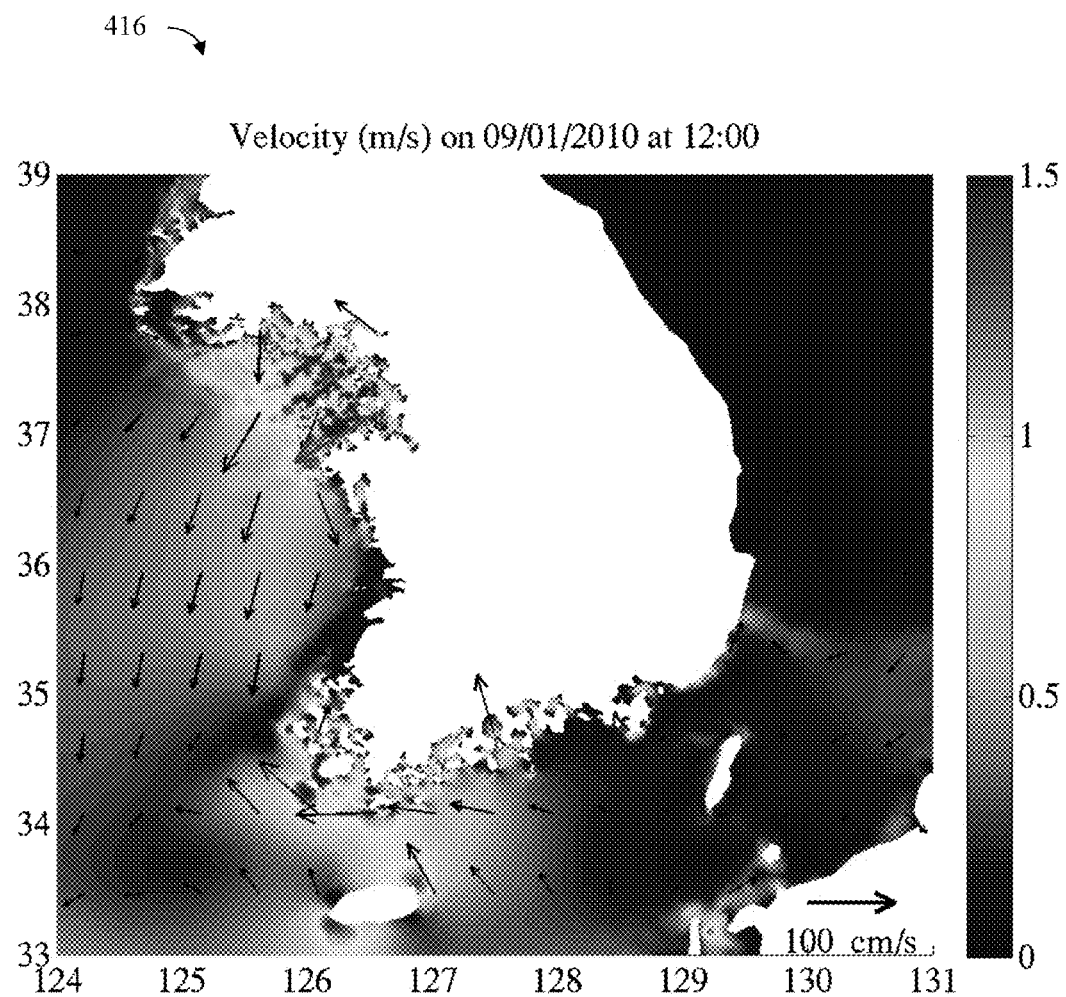
FIG. 14 is a pictorial view of the current velocity product created according to the present teachings.

Referring now to FIG. 14, current velocity 416 in meters/second on Sep. 1, 2010, is shown as a product of the embodiments of the present teachings.

Figure 15:
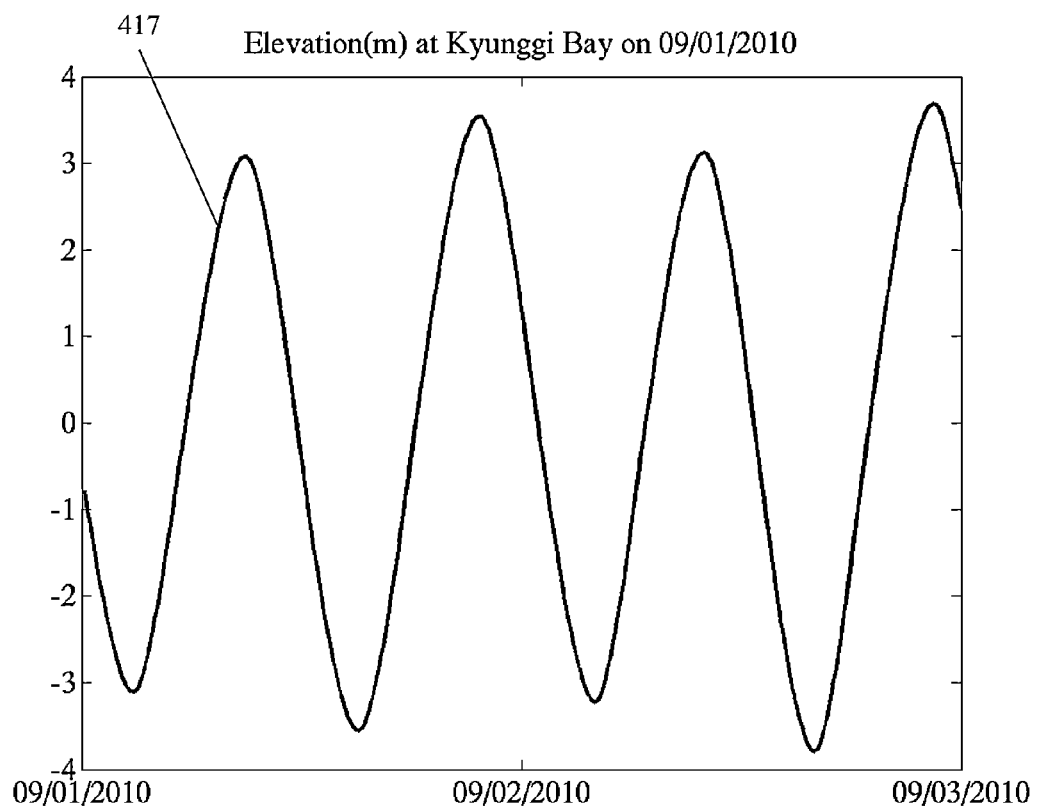
FIG. 15 is a time series product of water elevation created according to the present teachings.

Referring now to FIG. 15, water elevation time series 417 from Sep. 1, 2010-Sep. 3, 2010, is shown as a product of the present teachings.

Figure 16:
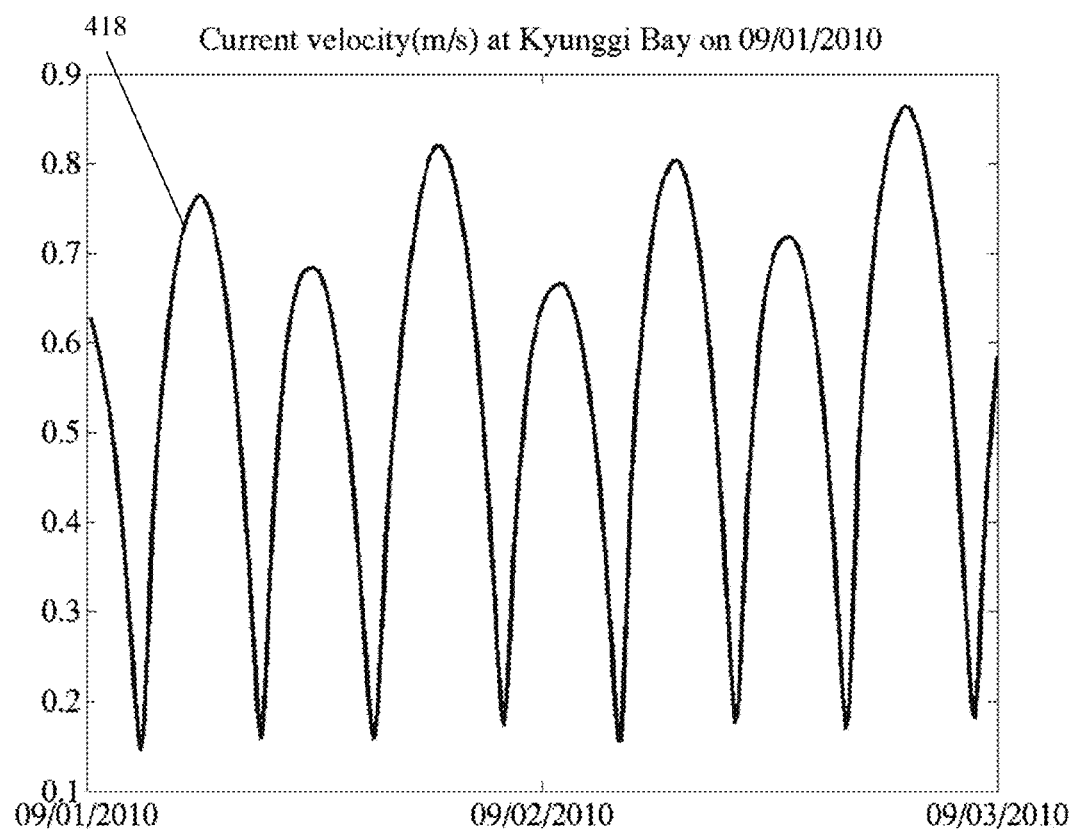
FIG. 16 is a time series product of current velocity created according to the present teachings.

Referring now to FIG. 16, current velocity time series 418 from Sep. 1, 2010-Sep. 3, 2010, is shown as a product of the present teachings.

Embodiments of the present teachings are directed to computer systems for accomplishing the methods discussed in the description herein, and to computer readable media containing programs for accomplishing these methods. The raw data and results can be stored for future retrieval and processing, printed, displayed, transferred to another computer, and/or transferred elsewhere. Communications links can be wired or wireless, for example, using cellular communication systems, military communications systems, and satellite communications systems. In an exemplary embodiment, the software for the system is written in Fortran and C. The system operates on a computer having a variable number of CPUs. Other alternative computer platforms can be used. The operating system can be, for example, but is not limited to, WINDOWS® or LINUX®.

The present embodiment is also directed to software for accomplishing the methods discussed herein, and computer readable media storing software for accomplishing these methods. The various modules described herein can be accomplished on the same CPU, or can be accomplished on a different computer. In compliance with the statute, the present embodiment has been described in language more or less specific as to structural and methodical features. It is to be understood, however, that the present embodiment is not limited to the specific features shown and described, since the means herein disclosed comprise preferred forms of putting the present embodiment into effect.

Referring again primarily to FIGS. 4 and 7, methods 150 and 160 can be, in whole or in part, implemented electronically. Signals representing actions taken by elements of system 100 and other disclosed embodiments can travel over at least one live communications network. Control and data information can be electronically executed and stored on at least one computer-readable medium. The system can be implemented to execute on at least one computer node in at least one live communications network. Common forms of at least one computer-readable medium can include, for example, but not be limited to, a floppy disk, a flexible disk, a hard disk, magnetic tape, or any other magnetic medium, a compact disk read only memory or any other optical medium, punched cards, paper tape, or any other physical medium with patterns of holes, a random access memory, a programmable read only memory, and erasable programmable read only memory (EPROM), a Flash EPROM, or any other memory chip or cartridge, or any other medium from which a computer can read. Further, the at least one computer readable medium can contain graphs in any form including, but not limited to, Graphic Interchange Format (GIF), Joint Photographic Experts Group (JPEG), Portable Network Graphics (PNG), Scalable Vector Graphics (SVG), and Tagged Image File Format (TIFF).

Although the present teachings have been described with respect to various embodiments, it should be realized these teachings are also capable of a wide variety of further and other embodiments.

What is claimed is:

1. An automatic method for predicting tidal heights and currents using an automated forecast model comprising:
   accessing, by a specially programmed computer, processing options;
   automatically locating, by the specially programmed computer, at least one water cell and at least one river based on the processing options, wherein the at least one water cell and the at least one river are represented as geographic data in a graphical map that is displayed on a display device;
   automatically determining river discharge data for the at least one water cell, including:
      determining a domain of a forecast;
      if one of the at least one river is located within the domain, automatically locating the at least one water cell in the domain coincident with the one of the at least one river, if possible, or automatically locating the at least one water cell in the domain, the at least one water cell having a predetermined water depth and being near the one of the at least one river; and
      automatically calculating river discharge flow rates for the at least one water cell;
   automatically providing, by the specially programmed computer, the at least one water cell, the river discharge data, and the processing options, to the forecast model;
   automatically receiving a forecast from the forecast model based on the at least one water cell, the river discharge data, and the processing options;
   automatically generating a mapped product based on the forecast, wherein the mapped product comprises spatial data corresponding to a plurality of forecasted parameters in the forecast; and
   automatically updating the graphical map displayed on the display device to include the mapped product.

2. The method as in claim 1 further comprising:
   creating at least one electronic file having information related to the forecast;
   accepting input parameters related to the forecast;
   updating the at least one electronic file based on the input parameters;
   collecting required data related to the forecast model based on the at least one updated file;
   accessing a grid related to the forecast;
   mapping the required data into the grid; and
   providing the grid to the forecast model.

3. The method as in claim 2 wherein said collecting required data comprises:
   generating a wind field and interpolating the wind field to create fort.22 data;
   generating grid data from a global bathymetry database and a global shoreline database to create fort.14 data, the fort.14 data based on the grid data or a grid database;
   preparing tide boundary conditions and tidal potential, including fort.15 data, based on a tidal database;
   creating the grid based on either the grid data or the grid database; and
   providing the required data including the fort.22 data, the fort.14 data, the fort.15 data, and the grid.

4. The method as in claim 3 further comprising:
   receiving a selection of a region associated with the forecast; and
   retrieving the grid data associated with the region.

5. The method as in claim 1 further comprising steps of:
   (a) automatically determining an available number of computer processors available for executing the forecast model, the forecast model having a forecast period;
   (b) automatically estimating the execution time required to execute the forecast model on the computer processors based on the available number and the forecast period;
   (c) automatically executing an alternative procedure if the execution time is larger than the forecast period; and
   (d) automatically partitioning a domain of the forecasting model based on the available number of computer processors.

6. The method as in claim 5 wherein the alternative procedure comprises:
   repeating the steps (a), (b), and (c).

7. The method as in claim 6 wherein the alternative procedure comprises:
   waiting for a pre-selected amount of time; and
   repeating the steps (a), (b), and (c).

8. The method as in claim 1 further comprising:
   estimating required computer storage space of a pre-selected execution of the forecast model;
   determining available storage space for a future execution of the forecast model by comparing the estimated required storage space to available space in the computer system;
   accessing additional storage space and providing the additional storage space to the forecasting model if the available storage space does not accommodate the forecast model;
   if current spatial and temporal data are available, providing needed data to the forecast model based on spatial and temporal interpolation of the current spatial and temporal data; and
   if the current spatial and temporal data are not available, providing the needed data to the forecast model based on resulting data from previous model executions.

9. The method as in claim 8 further comprising:
   providing the needed data to the forecast model based on resulting data from previous model executions for a maximum of two iteration of the forecast model.

10. A system for predicting tidal heights and currents using an automated forecast model comprising:
- a forecast model input creation processor using at least one file having data that are generic to input data required for the forecast model, and input parameters to produce a grid having the input data required for the forecast model;
- a tidal heights and currents prediction processor using a forecast domain to produce at least one water cell and river discharge data associated with the at least one water cell including:
  - a river proximity processor automatically locating at least one water cell in the forecast domain, the forecast domain being coincident with at least one river, if the at least one river is located within the forecast domain, or automatically locating the at least one water cell in the forecast domain having a predetermined water depth and being near the at least one river, wherein the at least one water cell and the at least one river are represented as geographic data in a graphical map that is displayed on a display device;
  - a flow rate processor determining river discharge flow rate of the at least one water cell, the flow rate processor converting the flow rate into river discharge data; and
  - a forecast model processor incorporating the at least one water cell and the river discharge data into the forecast model;
- wherein the forecast model processor provides the grid, the at least one water cell, and the river discharge data to the forecast model, the forecast model producing a forecast of tidal heights and currents, the forecast being stored on a computer-readable medium; and
- a product generation processor:
  - using the forecast to generate a mapped product, wherein the mapped product comprises spatial data corresponding to a plurality of forecasted parameters in the forecast; and
  - updating the graphical map displayed on the display device to include the mapped product.

11. The system as in claim 10 wherein the forecast model input creation processor comprises:
- a generic file processor populating the at least one file with information related to the forecast, the generic file processor accepting the input parameters related to the forecast, the generic file processor updating the at least one file based on the input parameters;
- a required data processor collecting the required data related to the forecast model based on the at least one updated at least one file; and
- a grid processor accessing the grid, the grid processor mapping the required data into the grid, the grid processor providing the grid to the forecast model processor.

12. The system as in claim 11 wherein the required data processor comprises:
- generating a wind field and interpolates the wind field to create fort.22 data;
- generating grid data from a global bathymetry database and a global shoreline database;
- preparing tide boundary conditions and tidal potential, including fort.15 data, based on a tidal database; and
- creating a grid and fort.14 data based on either the grid data or a grid database.

13. The system as in claim 12 further comprising an execution time optimization processor including:
- a CPU locator automatically determining an available number of computer processors available for executing the forecast model;
- an execution time processor automatically estimating the execution time required to execute the forecast model on the computer processors based on the available number and the forecast period;
- an alternatives processor automatically executing an alternative procedure if the execution time is larger than the forecast period;
- a domain processor automatically decomposing a domain of the forecast model based on the available number; and
- an input file processor automatically preparing input files for the forecast model based on the available number,
wherein the forecast model processor:
  - automatically initiates the forecast model on the computer processors based on the input files, the forecast period, and the domain;
  - automatically receives a forecast over the forecast period from the forecasting model; and
  - automatically provides the forecast to a computer-readable medium.

14. The system as in claim 10 further comprising a reliability and stability processor including:
- a storage space processor estimating required storage space of a pre-selected execution of the forecast model, the storage space processor determining available storage space for a future execution of the forecast model by comparing the estimated required storage space to available space in the computer system, the storage space processor accessing additional storage space and providing the additional storage space to the forecast model if the available storage space does not accommodate the forecast model;
- an interpolator providing needed data to the forecast model processor based on spatial and temporal interpolation of current data if current spatial and temporal data are available; and
- a previous model execution data processor providing the needed data to the forecast model processor based on resulting data from previous model executions for a maximum of two iterations of the forecast model if the current spatial and temporal data are not available.

15. A non-transitory computer readable medium for predicting tidal heights and currents using an automated forecast model comprising computer code executing:
- accessing processing options;
- automatically locating at least one water cell and at least one river based on the processing options, wherein the at least one water cell and the at least one river are represented as geographic data in a graphical map that is displayed on a display device;
- determining a domain of the forecast model;
- if at least one river is located within the domain, automatically locating the at least one water cell in the domain, the at least one water cell being coincident with the at least one river, if possible, or automatically locating the at least one water cell in the domain, the at least one water cell having predetermined water depths and being near the at least one river, wherein the at least one water cell and at least one river are represented as geographic data in a graphical map that is displayed on a display device;
- determining river discharge flow data of the at least one water cell;

automatically providing the at least one water cell and the river discharge data to the forecast model;

automatically receiving a forecast from the forecast model, the forecast based on the at least one water cell and the river discharge data;

automatically generating a mapped product based on the forecast, wherein the mapped product comprises spatial data corresponding to a plurality of forecasted parameters in the forecast; and automatically updating the graphical map displayed on the display device to include the mapped product.

16. The non-transitory computer readable medium as in claim 15 further comprising:

creating at least one file having information related to the forecast;

accepting input parameters related to the forecast;

updating the at least one file based on the input parameters;

collecting required data related to the forecast model based on the at least one updated file;

accessing a grid related to the forecast;

mapping the required data into the grid; and providing the grid to the forecast model.

17. The non-transitory computer readable medium as in claim 15 further comprising:

automatically determining an available number of computer processors available for executing the forecast model, the forecast model having a forecast period;

automatically estimating the execution time required to execute the forecast model on the computer processors based on the available number and the forecast period;

automatically executing an alternative procedure if the execution time is larger than the forecast period;

automatically partitioning a domain of the forecasting model based on the available number; and automatically optimizing storage required for executing the forecast model based on the available number.

18. The non-transitory computer readable medium as in claim 15 further comprising:

estimating required storage space of a pre-selected execution of the forecast model;

determining available storage space for a future execution of the forecast model by comparing the estimated required storage space to available space in a computer system;

providing additional storage space to the forecasting model if the available storage space does not accommodate the forecast model;

if current spatial and temporal data are available, providing needed data to the forecast model based on spatial and temporal interpolation of current data; and if the current spatial and temporal data are not available, providing the needed data to the forecast model based on resulting data from previous model executions for a maximum of two iterations of the forecast model.

* * * * *